(12) United States Patent
Pettesch

(10) Patent No.: US 6,244,288 B1
(45) Date of Patent: Jun. 12, 2001

(54) LIQUID FUEL TANKER TRUCK AND METHOD WITH AUTOMATIC SHUTOFF TRANSPORT FOOT VALVE

(75) Inventor: Martin C. Pettesch, Cranford, NJ (US)

(73) Assignee: Technalink, Inc., Cranford, NJ (US)

( * ) Notice: Subject to any disclaimer, the term of this patent is extended or adjusted under 35 U.S.C. 154(b) by 0 days.

(21) Appl. No.: 09/307,330

(22) Filed: May 7, 1999

(51) Int. Cl.$^7$ .................................................. F16K 17/14

(52) U.S. Cl. ........................................ 137/68.14; 137/267

(58) Field of Search .................................. 137/68.14, 410, 137/77, 421, 75, 267; 141/231; 222/54

(56) References Cited

U.S. PATENT DOCUMENTS

| | | | | |
|---|---|---|---|---|
| 2,430,956 | * | 11/1947 | Scott | 137/267 |
| 3,095,894 | * | 7/1963 | Jensen | 137/267 |
| 3,310,070 | * | 3/1967 | Black | 137/267 |
| 3,319,645 | * | 5/1967 | Mahoney et al. | 137/267 |
| 3,360,000 | * | 12/1967 | Weston et al. | 137/267 |
| 3,378,021 | * | 4/1968 | Milo | 137/68.14 |
| 3,489,160 | * | 1/1970 | Moore | 137/68.14 |
| 3,515,157 | * | 6/1970 | Milo | 137/68.14 |
| 3,630,214 | * | 12/1971 | Levering | 137/68.14 |
| 3,797,510 | * | 3/1974 | Torres et al. | 137/68.14 |
| 3,860,025 | * | 1/1975 | Nelson | 137/68.14 |
| 3,913,603 | * | 10/1975 | Torres | 137/68.14 X |
| 4,898,199 | * | 2/1990 | Morris et al. | 137/68.14 |
| 5,099,870 | * | 3/1992 | Moore et al. | 137/68.14 |
| 5,193,569 | * | 3/1993 | Moore et al. | 137/68.14 |
| 5,244,006 | * | 9/1993 | Pettesch | 137/68.14 |

OTHER PUBLICATIONS 1 page sales sheet, EBW, Dated Nov. 1995, Form #8122.
4 page sales sheet, EBW, Dated May 1996, Form No. 6116.

Bottom Loading and Vapor Recovery for MC-306 Tank Motor Vehicles, Transportation Department, API Recommended Practice 1004, American Petroleum Institute, Seventh Edition, Nov. 1988.

* cited by examiner

Primary Examiner—John Rivell
(74) Attorney, Agent, or Firm—Edward Dreyfus

(57) ABSTRACT

A fuel tanker truck for and a method of transporting liquid fuel, in a tanker truck having a fuel storage compartment and a delivery pipe having a compartment end controllably communicating with the interior of the tanker storage compartment and a distal end having an adaptor. The method includes substantially filling the delivery pipe with liquid fuel, transporting the fuel in the delivery pipe, and during or after the transporting step, trapping and sealing the liquid fuel within the delivery pipe in response to the storage compartment end of the delivery pipe separating from controllable communication with the interior of the storage compartment. The delivery pipe compartment end is coupled to the compartment by the assembly includes a housing having an upstream section for receiving liquid from the storage tank and a downstream section for delivering liquid to the delivery pipe, and a shear groove located between the upstream and downstream sections for separating the upstream and downstream sections in response to an impact force applied to one of the sections. An emergency valve subassembly is located upstream of the shear groove for selectively controlling the flow of liquid from the storage tank into the upstream section, and a shut-off valve subassembly seals closed the liquid flow path through the downstream section in response to the separation of the downstream section from the upstream section. This action traps the fuel in the delivery pipe instead of allowing fuel to escape and cause damage to people, property, and the environment.

11 Claims, 6 Drawing Sheets

LIQUID FUEL TANKER TRUCK AND METHOD WITH AUTOMATIC SHUTOFF TRANSPORT FOOT VALVE

BACKGROUND

This invention relates to mobile liquid containers, such as gasoline or other liquid product tanker trucks or rail cars, and more particularly to emergency shut-off or foot valves that are part of such mobile containers.

With reference to FIG. 7, fueling tanker trucks are typically constructed with an elongated under-carriage frame and an elongated, horizontal storage tank having a number of internally divided compartments with various unequal volume capacities to store and transport gasoline, fuel oil, aircraft fuels, or other volatile liquids and fuels. Gasoline tankers are typically bottom loaded through load only or load/unload couplers or adaptors 100 located below and toward the center of and longitudinally along the tanker undercarriage.

Each adaptor 100 communicates with the bottom of a respective storage compartment through an elongated 4" rigid delivery pipe 102 made of cast aluminum, bronze, or steel. The compartment end of the delivery pipe communicates with a compartment through an emergency poppet valve 104 (sometimes referred to as a foot valve) mounted in the compartment bottom and operated by an external handle. The adapter 100 at the end of the delivery pipe 102 releasably mates with a corresponding coupler on a delivery hose 106. The far end of delivery hose (not shown) couples into the below ground riser coupler associated with the below ground gasoline storage tank when liquid product is to be discharged from the tanker to the below ground storage tank.

Each tank emergency valve 104 includes a poppet valve that seats in a normally closed position within the coupler. The standard emergency valve 104 includes an operating handle that, when rotated to the fill position, rotates an internal actuator that raises the tank coupler poppet valve to allow liquid flow by gravity through the housing of valve 104 into the delivery pipe, through the delivery hose and into the top of the riser, drop tube, and storage tank below. The handle of valve 104 is coupled to the operator control handle of adapter 100 so that these handles operate together in ganged fashion. Vapor recovery lines (not shown) connected from the tank top back to the tanker manifold equalizes vapor pressures and stores vapors in the tanker that had been displaced from the top region of the below ground tank by the fill liquid.

Fill liquid enters the riser at a high rate, e.g. 340 gallons per minute. When the below ground tank reaches a predetermined fill level, conventional overfill prevention apparatus located in the drop tube greatly restricts or cuts off drop tube flow. The operator then rotates the adaptor 100 and emergency valve 104 fill handles to their closed positions which in turn shuts and seals the adaptor 100 and emergency tank valve poppet 104 closed. This action traps the fuel within the delivery pipe 102. Next, the operator disconnects the upstream end of the delivery hose 106 from the adaptor 100 at the downstream end of delivery pipe 102. Gasoline in the hose simply bleeds into the top of the riser as the operator lifts and "walks" the hose sections toward the riser. The hose is then disconnected at the riser and stowed on the tanker for transport to the next site.

Note the process purposely traps about 20 gallons of gasoline in the long delivery pipe 102 (and about 5 gallons in the short pipe 102) avoiding excessive air being forced down into the riser and drop tube when fill liquid flow next begins or air being forced into the tanker compartment during bottom filling process. However, this standard practice creates a dangerous and hazardous condition because delivery pipes extend along and adaptors are located at an exposed side of the tanker. It is known that tanker sides occasionally impact cars, other trucks, poles, or other objects when making turns on city streets or otherwise. This impact causes the shear fitting of the emergency valve 104 housing to shear thus dislocating the upstream delivery pipe end from the tank. Although no gasoline emits from the tanker compartment because the poppet remains closed, nevertheless the liquid product within the delivery pipe discharges from the now free (upstream) pipe end in liquid and vapor form at a high rate and sprays along the ground and in the air. Volatile vapors blanket the general area and liquid has been known to wet objects and people in the area. Fires and combustion are known to have resulted.

SUMMARY OF EXEMPLARY EMBODIMENTS OF THE PRESENT INVENTION

A delivery system according to the principles of the present invention avoids the above mentioned problems, prevents the escape of liquid or vapors in the event of tank adaptor or emergency valve impact or shear, and provides for a safer and less polluting system for tanker liquid transport.

One exemplary embodiment includes a fill pipe associated emergency or foot valve assembly having an emergency poppet valve subassembly for controlling delivery liquid flow and a second spring loaded shut-off valve subassembly normally held in the open position. In the event the delivery pipe section of the valve assembly housing is sheared from or dislocates from the tank section of the valve assembly housing by reason of an impact force to the associated adaptor, delivery pipe or emergency valve, the shut-off valve subassembly automatically closes to trap and seal the delivery pipe liquid therein to the great safety of persons and objects in the area and to protect the environment from pollution.

DRAWINGS

Other and further features and advantages of the present invention will become apparent when taken in view of the appended drawings, in which.

DETAILED DESCRIPTION OF EXEMPLARY EMBODIMENT

Figure 1:
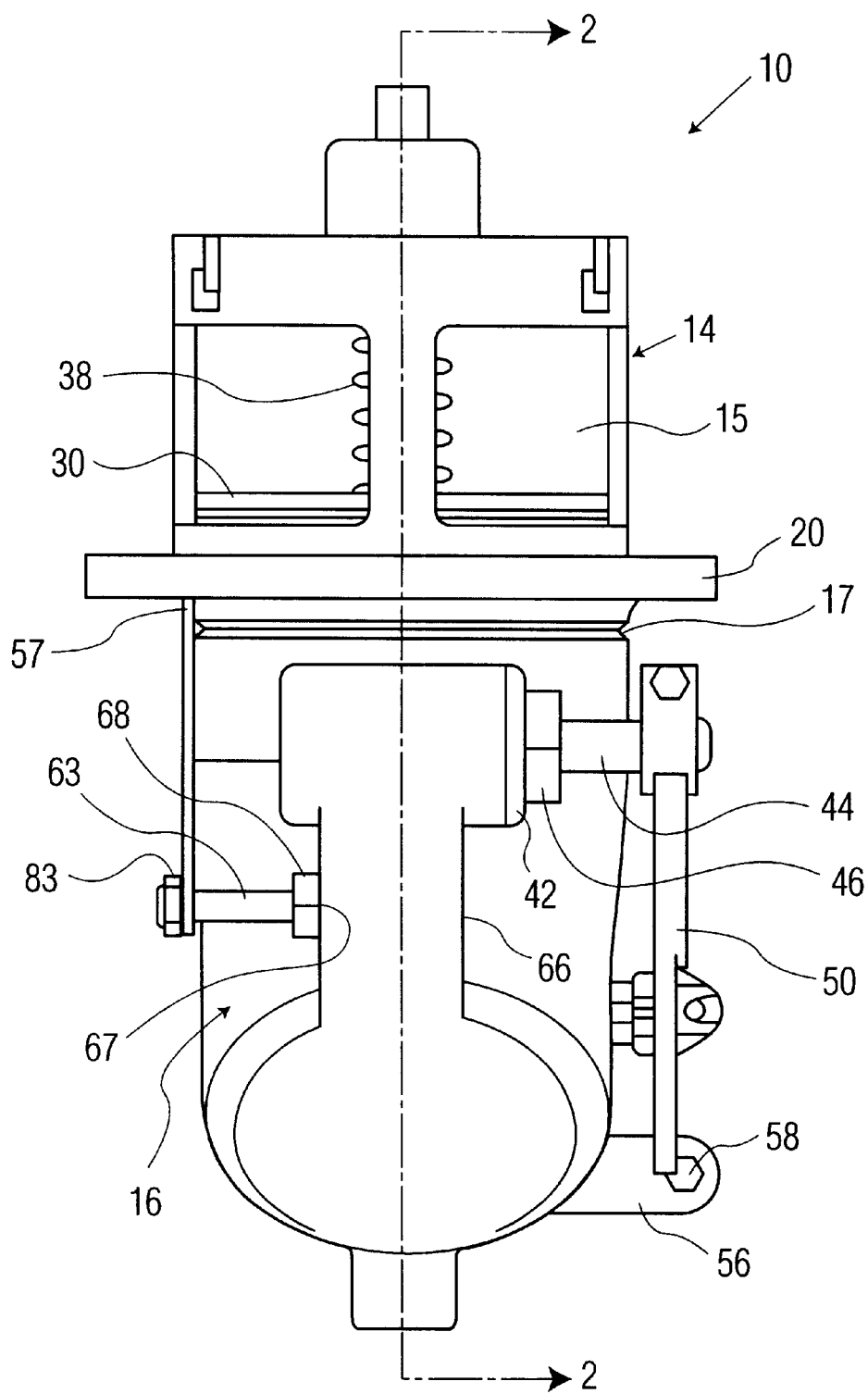
FIG. 1 is a front elevation view of an exemplary emergency or foot valve assembly according to the principles of the present invention.
Figure 2:
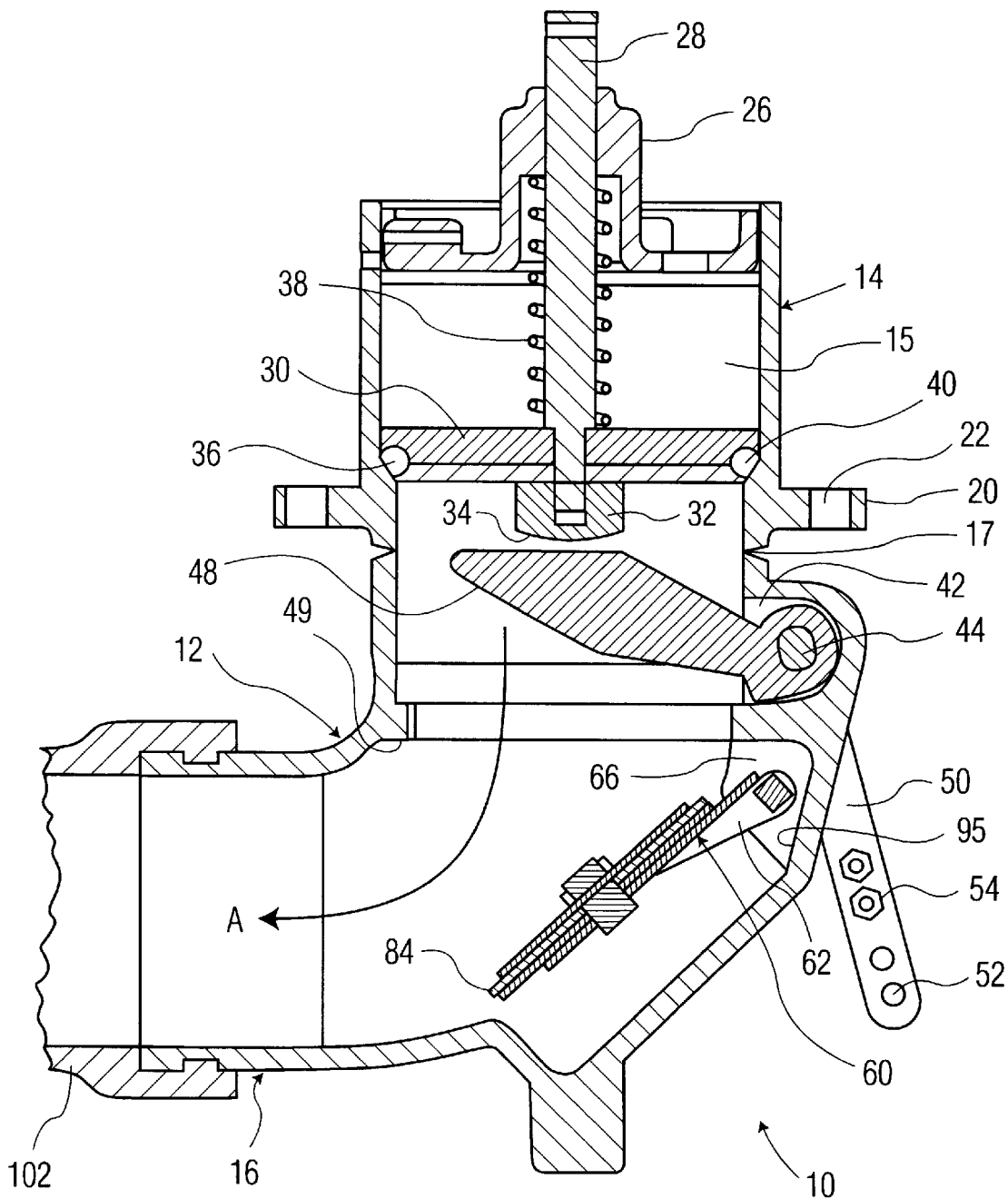
FIG. 2 is a side section view taken along line 2—2 of FIG. 1.
Figure 3:
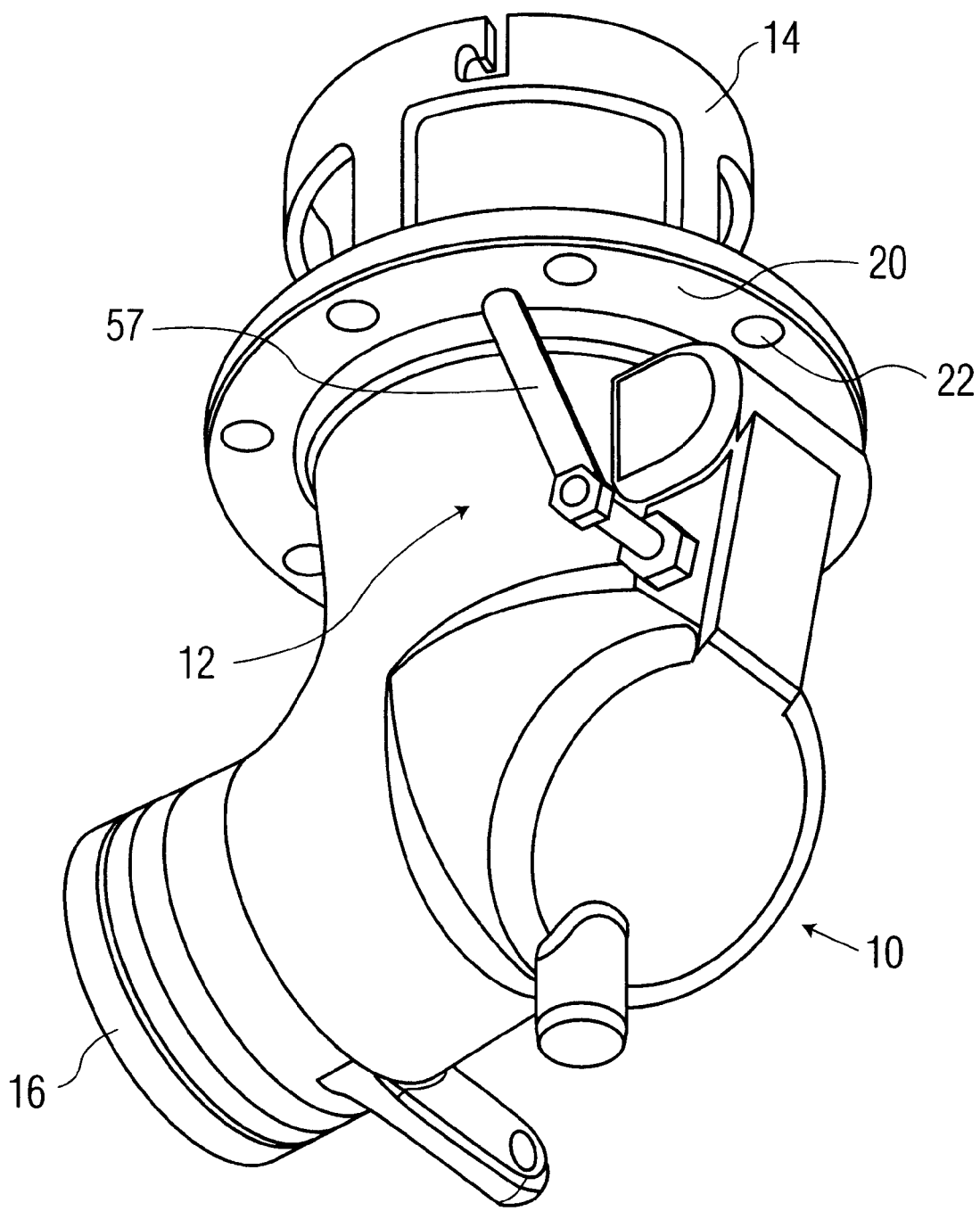
FIG. 3 is a perspective view taken from the bottom-left side of FIG. 1 without the emergency shut-off poppet assembly shown.
Figure 4:
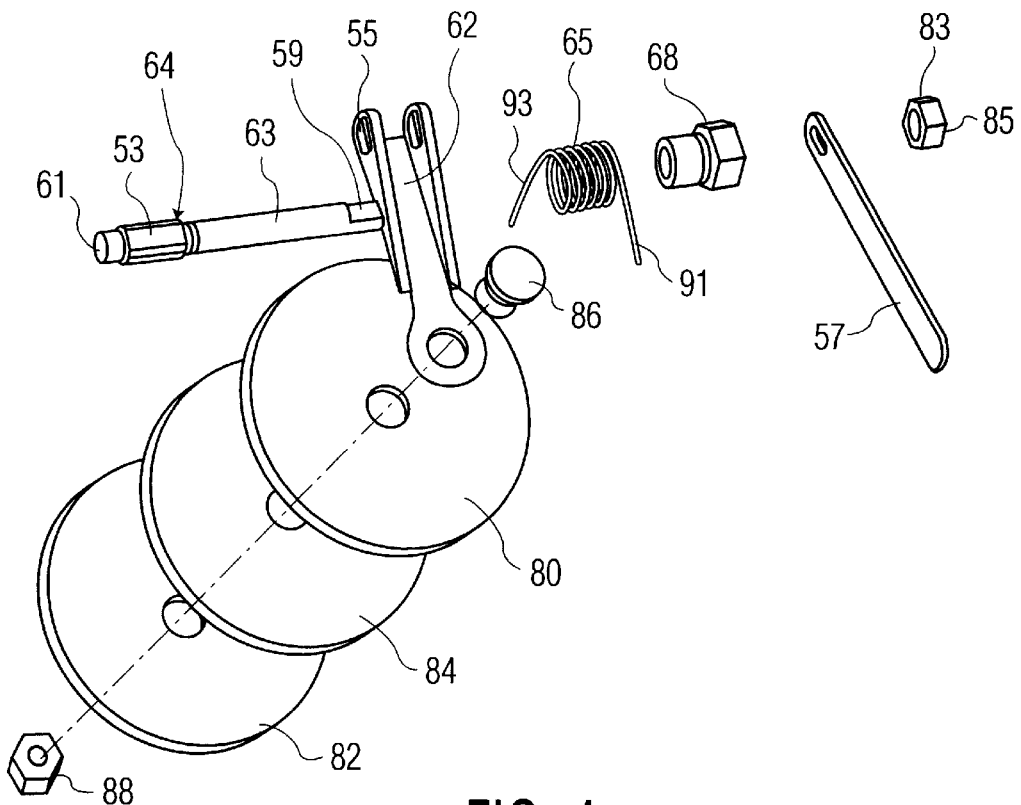
FIG. 4 is an exploded view of an example of shut-off poppet valve that can be used in the assembly of FIG. 1.
Figure 5:
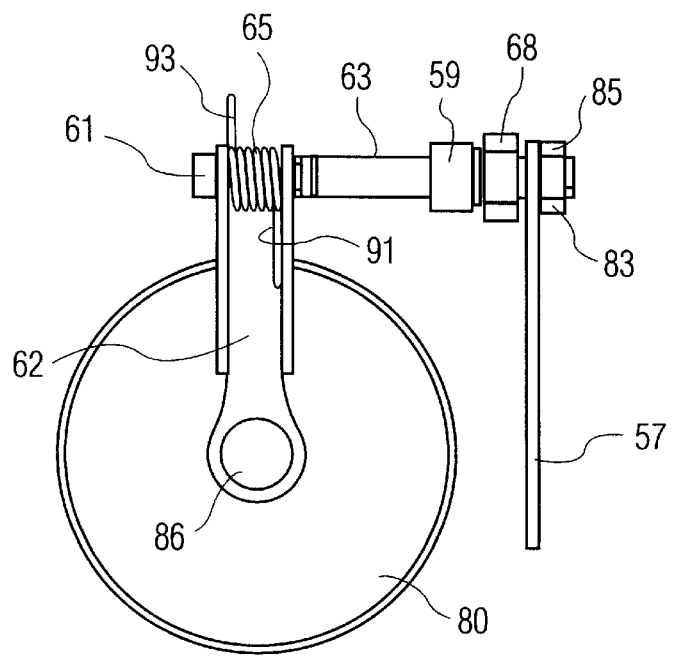
FIG. 5 is a bottom view in the direction of the arrow associated with reference numeral 10 of the assembled shut-off poppet valve of FIG. 4.
Figure 6:
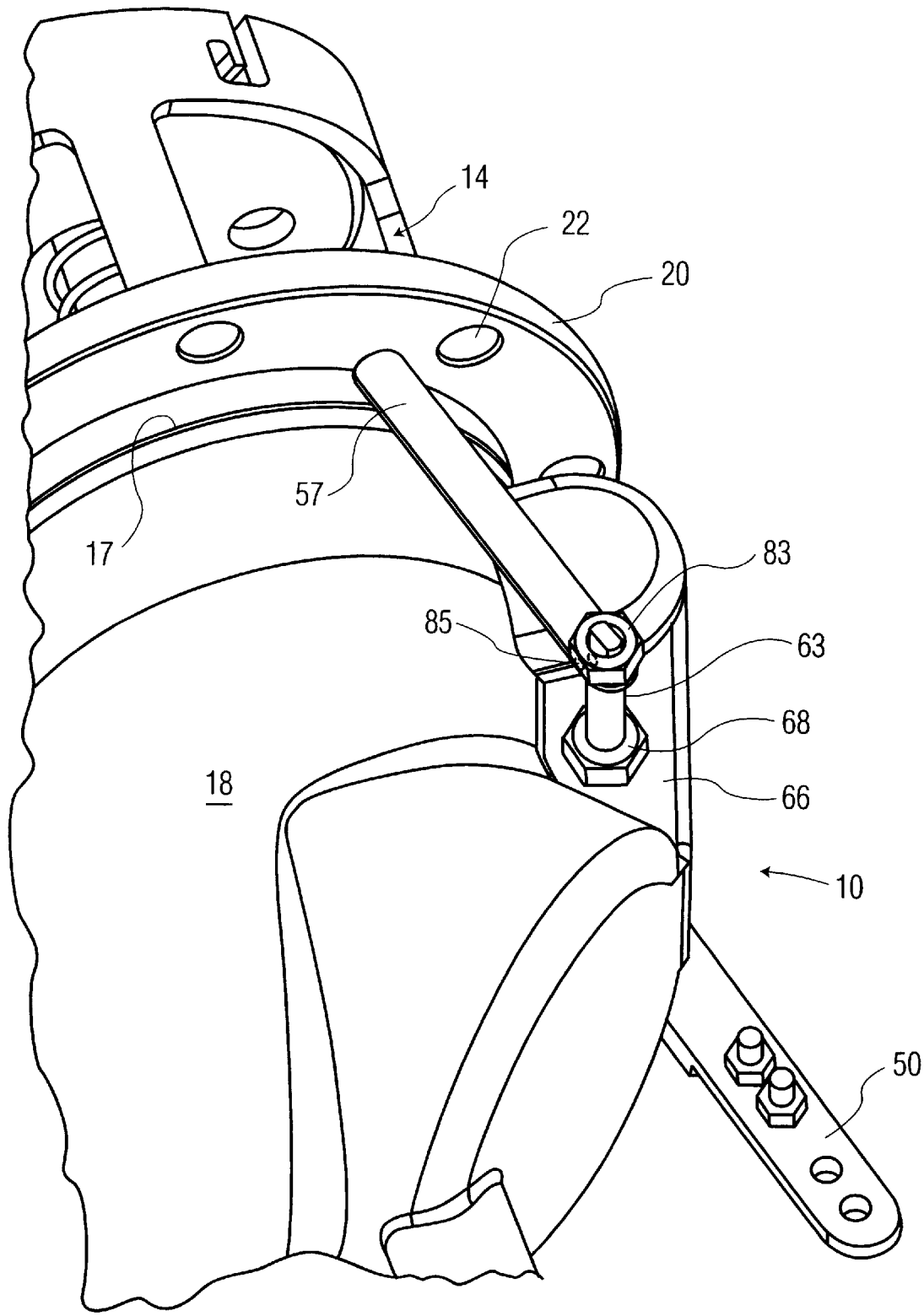
FIG. 6 is a partial, enlarged partial perspective view of the embodiment of FIGS. 1 and 2.
Figure 7:
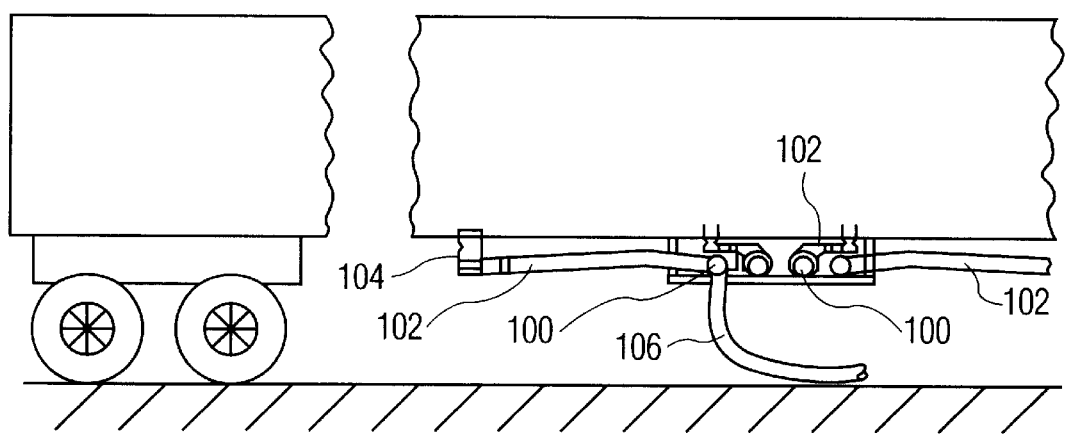
FIG. 7 is a partial side view of a typical tanker truck showing a delivery hose coupled to one of the adaptors for product delivery.

With reference to FIGS. 1–6, an exemplary embodiment according to the principles of the present invention includes an emergency or foot valve assembly 10 that includes a hollow, liquid flow directing housing 12 forming an upper vertical emergency poppet valve section 14, and a horizontal delivery pipe coupling section 16. These two sections are separated by shear groove 17. Housing 12 receives and directs liquid flow from section 14 to section 16 in the direction of arrow A when the emergency poppet 36 is in the open position as described below. Section 14 includes flange 20 having opening 22 for receiving mounting bolts (not shown) that securely mount assembly 10 to the underside of a tank compartment (not shown) with section 14 upper portion extending into communication with the bottom of the storage compartment. Gaskets or other devices (not shown) seal the assembly to the tank to prevent leakage in the standard manner. Section 14 also includes windows or openings 15 to enable high flow rate of liquid product into housing 12. Poppet valve stem guide 26 secured to the upper portion of section 14 guides the stem 28 of poppet valve 30 held to its lower threaded end by retainer nut 32 that forms a lower cam surface 34. O-ring 36 carried by poppet 30 normally presses against a valve seat in section 14 by action of spring 38 biasing poppet 30 to its normally closed position to block liquid flow through the valve opening in section 14.

Section 14 forms a valve opening and valve seat 40 and an horizontal shaft mount 42 through which operating shaft 44 is mounted for rotation. Shaft 44 extends through sealing devices 46. Emergency poppet actuating arm 48 within section 18 mounts to the internal part of shaft 44 and emergency valve operating arm 50 secures to the external part of shaft 44. Arm 50 is provided with holes 52 and/or bolts 54 and section 16 includes lug 56 that defines a through hole 58. Arm 50 can be operated in the conventional manner such as via cable connected to holes 52 and extending to the operators position through opening 58 or by air or hydraulic cylinder (not shown) mounted between lug 56 and arm 50.

Arm 50, shaft 44 and arm 48 are rotatable between a fully closed position (FIG. 2) and a fully open position in which the mechanism is rotated (clockwise in FIG. 2) causing arm 48 to engage surface 34 and force it and poppet 30 upward against spring 38 bias, thus opening the liquid flow path for normal delivery as described above. Poppet 30 remains open so long as the rotation force is applied to arm 50. When this force is removed, poppet 30 closes and seals by action of spring 38 and the liquid head pressure on the top side of poppet 30.

Housing 12 further includes a continuous shear groove 17 that shears and breaks section 16 away from section 14 whenever predetermined impact force is applied to section 16 relative to section 14. This force could originate from an impact to adapter 100 or the delivery pipe 102 connected to assembly 10.

Section 16 also houses a second or shut-off valve subassembly (e.g. a poppet valve assembly) biased to immediately close and seal the liquid flow path through section 16 as soon as section 16 shears from section 14. In this example, the shut-off valve assembly includes poppet valve 60 mounted to poppet arm 62 that in turn is mounted to shaft 64. Shaft 64 includes cylindrical parts 61 and 63 that mounts for rotation to housing portions 66 and 67, respectively. Arm 62 includes ears 55 having rectangular slots for seating on flattened portion 53 of shaft 64. Shaft 64 also includes a flattened portion 59 extending outside housing 12 that fits through the slot of and mounts poppet control link arm 57.

Poppet 60 can include a pair of poppet washers 80 and 82 sandwiching a poppet Buna disk 84 and held to the distal end of arm 62 by threaded bolt 86 and nut 88. Disks 80, 82 and 84 are dimensioned to enable the outer periphery of Buna disk 84 to seal against seat 49 when this poppet assembly rotates upward to the closed position. See FIG. 2. It will be noted that seat 49 is preferably located across the axis of the downward flow path of section 14 and that valve 84 is, when fully open, preferably located generally at the intersection of section 16 and section 14 flow path axes.

Shaft 64 extends from housing 12 through sealing guide nut 68. Spring 65, having one end 91 engaging on 62 and the other end 93 engaging housing 12 interior wall 95, is biased to rotate poppet 60 to its closed position from its normally filly open position shown in FIG. 2. Shear valve restraining link arm 57 couples to shaft 64 at the flat end 59 and extends upward to engage the underside of flange 20. Link 57 is held on shaft end 59 by nut 83 that includes any suitable securing means such as a set screw 85 threaded through nut 83 to engage the flat end 59 and/or a hole (not shown) in end 59. See FIGS. 1 and 6. Spring 65 applies substantial rotation force to rotate shaft 64 counter clockwise (FIG. 2) to close poppet 60 against seat 40. However, restraining link arm 57 prevents such rotation so long as arm 57 engages flange 20. In the event section 16 is sheared from section 14, arm 70 moves away from flange 20 and is free to rotate. Spring 65 rotates shaft 64, arm 70, and poppet 60 quickly to their fully closed positions, thus trapping any liquid in the delivery pipe 102 and section 16 and most of the liquid in section 18.

Various modifications and changes can be made to the herein disclosed exemplary embodiment without departing from the spirit and scope of the present invention. Also, it should be understood that upstream and downstream refers to positions when liquid flows from the storage tank to the delivery pipe. Opposite designations would apply when liquid flows from the delivery pipe to the storage tank.

What is claimed is:

1. A liquid fuel transport tanker truck comprising, in combination, an emergency and shut-off valve assembly for controlling the flow of liquid fuel from the tanker truck storage tank compartment to the tanker truck delivery pipe, the assembly comprising, a housing having an upstream section for receiving liquid from the storage tank and a downstream section for delivering liquid to the delivery pipe, and a shear groove located between said upstream and downstream sections and for separating said upstream and downstream sections in response to an impact force applied to one of said upstream and downstream sections, a first valve subassembly located upstream of said shear groove for selectively controlling the flow of liquid from the storage tank into said upstream section, and a second valve subassembly for sealing closed the liquid flow path through said downstream section in response to the separation at said housing shear groove of said downstream section from said upstream section, wherein liquid fuel within said delivery pipe during transport will be trapped in said delivery pipe by said second valve when said downstream and upstream sections become separated.

2. A tanker truck as set forth in claim 1 wherein said downstream section comprises a valve seat and said second valve sub-assembly includes a valve member movable between an open position for allowing liquid flow through said downstream section and a closed position for sealing against said valve seat for blocking liquid flow through said downstream section, and a spring member biasing said valve member toward the closed position.

3. A tanker truck as set forth in claim 2 wherein said second valve sub-assembly includes a link member coupled to said valve member for releasably retaining said valve member in the open position against the spring bias by releasably engaging a stationary portion of said upstream section, said link member being free to move in response to the separation of said upstream section from said downstream section, wherein the movement of said link member from engagement with said upstream section enables said valve member to move toward the closed position.

4. A liquid fuel transport tanker truck comprising, in combination, an emergency and shut-off valve assembly for controlling the flow of liquid fuel from the tanker truck storage tank compartment to the tanker truck delivery pipe, the assembly comprising, a housing having an upstream section for receiving liquid from the storage tank and a downstream section for delivering liquid to the delivery pipe, and a shear groove located between said upstream and downstream sections and for separating said upstream and downstream sections in response to an impact force applied to one of said upstream and downstream sections, a first valve subassembly located upstream of said shear groove for selectively controlling the flow of liquid from the storage tank into said upstream section, and a second valve subassembly for sealing closed the liquid flow path through said downstream section in response to the separation of said downstream section from said upstream section, wherein liquid fuel within said delivery pipe during transport will be trapped in said delivery pipe by said second valve when said downstream and upstream sections become separated, and wherein said downstream section comprises a valve seat and said second valve sub-assembly includes a valve member movable between an open position for allowing liquid flow through said downstream section and a closed position for sealing against said valve seat for blocking liquid flow through said downstream section, and a spring member biasing said valve member toward the closed position, and wherein said second valve sub-assembly includes a link member coupled to said valve member for releasably retaining said valve member in the open position against the spring bias by releasably engaging a stationary portion of said upstream section, said link member being free to move in response to the separation of said upstream section from said downstream section, wherein the movement of said link member from engagement with said upstream section enables said valve member to move toward the closed position, and wherein said second valve sub-assembly includes a shaft mounted to said housing for rotation, said shaft having a first part within said downstream section and a second part extending external said second section, said link member being coupled to said second part, and said valve member being coupled to said first part.

5. A tanker truck as set forth in claim 4 wherein said link member has a distal end that abuts and is held from movement by a part of said upstream section until said downstream and upstream section are separated.

6. A tanker truck as set forth in claim 5 wherein said part comprises a flange member for securing said upstream section to a tanker truck storage tank compartment.

7. A liquid fuel transport tanker truck comprising, in combination, an emergency and shut-off valve assembly for controlling the flow of liquid fuel from the tanker truck storage tank compartment to the tanker truck delivery pipe, the assembly comprising, a housing having an upstream section for receiving liquid from the storage tank and a downstream section for delivering liquid to the delivery pipe, and a shear groove located between said upstream and downstream sections and for separating said upstream and downstream sections in response to an impact force applied to one of said upstream and downstream sections, a first valve subassembly located upstream of said shear groove for selectively controlling the flow of liquid from the storage tank into said upstream section, and a second valve subassembly for sealing closed the liquid flow path through said downstream section in response to the separation of said downstream section from said upstream section, wherein liquid fuel within said delivery pipe during transport will be trapped in said delivery pipe by said second valve when said downstream and upstream sections become separated, and wherein said downstream section comprises a valve seat and said second valve sub-assembly includes a valve member movable between an open position for allowing liquid flow through said downstream section and a closed position for sealing against said valve seat for blocking liquid flow through said downstream section, and a spring member biasing said valve member toward the closed position, and wherein said upstream section includes a first flow path axis extending generally downward relative to the storage tank, said downstream section includes a second flow path axis extending at generally laterally to said first flow path, and said valve member being positioned generally at the intersection of said first and second flow path axes when in the open position.

8. A tanker truck as set forth in claim 7 wherein said valve seat is arranged generally across said first flow path axis.

9. A method of transporting liquid fuel in a tanker truck having (i) a fuel storage compartment and (ii) a delivery pipe having a compartment end controllably communicating with the interior of the storage compartment and a distal end having an adaptor thereon, said method comprising:

substantially filling the delivery pipe with liquid fuel, after said filling step, transporting the fuel while the fuel is at rest in the delivery pipe, and during or after said transporting step, trapping and sealing the liquid fuel within the delivery pipe in response to the storage compartment end separating from controllable communication with the interior of the storage compartment.

10. The method according to claim 9 wherein the delivery pipe compartment end is coupled to said compartment by an emergency valve assembly having a housing comprising an upstream section for directing liquid flow through the bottom of the compartment and a downstream section for directing flow through the compartment end of said delivery pipe and a shear groove for physically separating the upstream and downstream sections in response to an impact force applied to said upstream or said downstream section, wherein said trapping and sealing step includes preventing liquid flow through the downstream section whenever the upstream and downstream sections separate at the shear groove.

11. The method according to claim 10 wherein said downstream section includes a valve movable between an open position which enables liquid flow through the downstream section and a closed position which blocks liquid flow through said downstream section, and said method further comprising sensing the relative positions of the upstream and downstream sections and moving the valve to the closed position upon sensing that the distance between the upstream and downstream positions has increased.

* * * * *